United States Patent Office 2,964,541
Patented Dec. 13, 1960

2,964,541

16β-ALKYL PREGNENES, INTERMEDIATES THEREFOR AND PROCESSES FOR PREPARING SAME

Meyer Sletzinger, North Plainfield, William V. Ruyle, Scotch Plains, and Walter A. Gaines, Rahway, N.J., assignors to Merck & Co., Inc., Rahway, N.J., a corporation of New Jersey No Drawing. Filed July 22, 1958, Ser. No. 750,089

10 Claims. (Cl. 260—397.45)

This invention is concerned generally with novel steroid compounds and with novel processes of preparing the same. More particularly, it relates to 16β-alkyl steroids and to intermediates and processes for the production of these compounds.

The 16β-alkyl-3α-hydroxy-16 - pregnene - 11,20 - dione 3-acylate and 16β-alkyl-3α-hydroxy-16-pregnene-20-one compounds produced in accordance with this invention can be readily converted to 16β-alkyl-17α,21-dihydroxy-1,4-pregnadiene-3,11,20-trione and esters thereof which possess extremely high anti-inflammatory activity and are especially effective in the treatment of arthritis and related diseases since they can be administered for their cortisone-like action in extremely low dosage thereby minimizing undesired side effects.

In preparing 16β-alkyl-3α-hydroxy-16-pregnene-20-one 3-acylate or 16β-alkyl-3α-hydroxy-16 - pregnene - 11,20-dione 3-acylate, we utilize as a starting material 3α-hydroxy-16-pregnene-20-one 3-acylate having a hydrogen or oxygen at the 11-position which may be represented by the following formula—

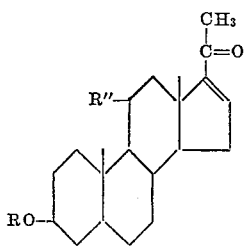

wherein R is an acyl group, and R″ is oxygen or hydrogen.

The above compound is reacted with a nitroalkane compound to form 3α - hydroxy - 16 - nitroalkyl - 11,20-pregnanedione 3-acylate which has the formula—

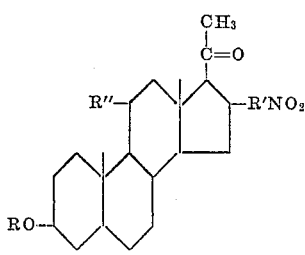

wherein R′ is an alkyl group and R and R″ are as above.

Treatment of the 3α-hydroxy-16-nitroalkyl-11,20-pregnanedione 3-acylate obtained above with an aliphatic aldehyde such as formaldehyde and hydrogen and a catalyst results in the formation of 3α-hydroxy-16-dialkyl-aminoalkyl - 11,20 - pregnanedione 3-acylate which may be represented by the formula—

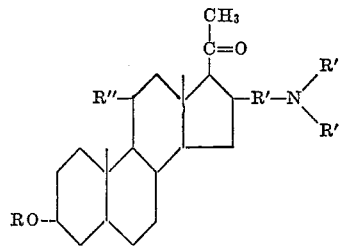

wherein R and R″ are as above.

Reaction of the above compound with a peracid such as hydrogen peroxide results in the formation of 3α-hydroxy-16-dialkyl-amino-alkyl-11,20-pregnanedione 3-acylate N-oxide which may be represented by the following structural formula—

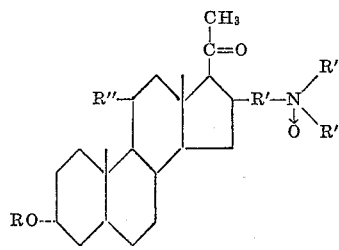

wherein R, R′, and R″ are as above.

Upon heating the above compound, there is formed a mixture of 16-alkyl-3α-hydroxy-16-pregnene-11,20-dione 3-acylate and 16-alkylene-3α-hydroxy - 11,20 - pregnanedione 3-acylate which have the following formula—

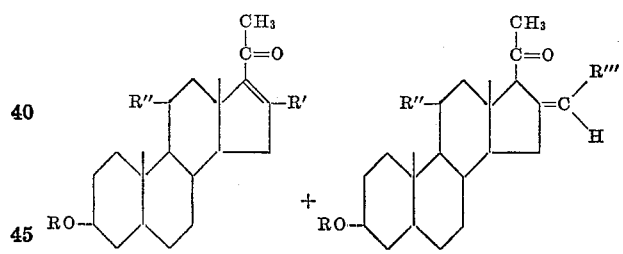

wherein R‴ is alkyl or hydrogen and R, R′ and R″ are as above.

The 3α-hydroxy-16-alkylene-11,20-pregnane 3-acylate can be converted to 3α-hydroxy-16-alkyl-16-pregnene-11,20-dione 3-acylate by treatment with base such as sodium hydroxide.

In accordance with a preferred embodiment of this invention, the starting material 3α-hydroxy-16-pregnene-11,20-dione 3-acetate is reacted with nitromethane at room temperature and 3α-hydroxy-16-nitromethyl-11,20-pregnanedione 3-acetate is recovered from the reaction mixture. The latter compound is then reacted with formaldehyde solution and hydrogen to form 3α-hydroxy-16-dimethylaminomethyl-11,20-pregnanedione 3-acetate. Reaction of the latter compound with hydrogen peroxide or an organic peracid such as peracetic acid, in the presence of methanol at room temperature results in an almost quantitative yield of 3α-hydroxy-16-dimethyl-aminomethyl-11,20-pregnanedione 3-acetate N-oxide. The latter compound is heated to form 3α-hydroxy-16-methyl-16-pregnene-11,20-dione 3-acetate and 3α-hydroxy-16-methylene - 11,20 - pregnanedione 3-acetate. The 3α-hydroxy-16 - methylene - 11,20 - pregnanedione 3-acetate is readily isomerized to 3α-hydroxy-16-methyl-16-pregnene-11,20-pregnane-dione 3-acetate with base. Purification of the 3α-hydroxy-16-methyl-16-pregnene-11,20-dione is carried out by chromatographic procedures on an alumina column.

The 3α-hydroxy-16-methyl-16-pregnene-11,20-dione or esters thereof can be readily converted to 16β-alkyl-17α,21 - dihydroxy - 1,4 - pregnadiene-3,11,20-trione and esters thereof, compounds which possess extremely high anti-inflammatory activity. The procedure involves hydrogenation of the 3α-hydroxy-16-methyl-16-pregnene-11,20-dione 3-acylate to form 3α-hydroxy-16β-alkyl-11,20-pregnanedione 3-acylate reacting the latter compound with an alkyl oxalate to form an alkyl ester of 3α - acyloxy - 16β - alkyl-11,20-dioxo-21-pregnaneglyoxalate, hydrolyzing the latter compound with base and then reacting the glyoxylic acid with acyl anhydride in the presence of a strong acid catalyst to form an isomeric mixture of 3α,23-diacyloxy-16α-alkyl-21-normethyl-11-oxo-17(20),22-choladieno-24(20)-lactone and the 17(20)-isomer thereof, reacting the latter mixture with a peracid to form an isomeric mixture of 3α,23-diacyloxy-16α-alkyl - 21 - normethyl - 17(20) - oxido-11-oxo-22-choleno-24(20)-lactone, and the 17(20)-isomer thereof and hydrolyzing the latter mixture to form 16β-alkyl-3α,17α-dihydroxy-11,20-pregnanedione.

The 16β - alkyl-3α,17α-dihydroxy-11,20-pregnanedione thus obtained can be reacted with bromine to form 16β-alkyl - 21 - bromo-3α,17α-dihydroxy-11,20-pregnanedione, which is reacted with sodium iodide in acetone to produce 16β-alkyl-3α,17α-dihydroxy-21-iodo-11,20-pregnanedione, which is converted without isolation to 16β-alkyl-3α,17α,21-trihydroxy-11,20-pregnanedione 21-acylate by reaction with anhydrous potassium acetate. The 16β-alkyl - 3α,17α,21 - trihydroxy - 11,20 - pregnanedione 21-acylate is contacted with a vegetative growth of a culture of Nocardia blackwelli (American Type Culture Collection 6846) micro-organism to yield 16β-alkyl-17α,21-dihydroxy-1,4-pregnadiene-3,11,20-trione, a compound possessing anti-inflammatory activity.

The following examples are to be understood as illustrative only and are in no way to be construed as limiting the invention.

EXAMPLE 1

Preparation of 3α-hydroxy-16-nitromethyl-11,20-pregnanedione 3-acetate

A mixture of 70 g. of 3α-hydroxy-16-pregnene-11,20-dione 3-acetate, 140 ml. of piperidine, and 500 ml. of nitromethane was kept at 25° C. for 65 hours. The mixture was concentrated in vacuo to a small volume, and flushed twice with 100 ml. portions of toluene. The residue was taken up on 300 ml. of methylene chloride, washed with 50 ml. of 2.5 N hydrochloric acid, and then with water. After drying over anhydrous magnesium sulfate, the methylene chloride was removed by vacuum distillation. The residue was taken up in 100 ml. of hot benzene, and filtered while still warm. To the warm filtrate, 200 ml. of hexane were added slowly. After the mixture had been cooled at 5° C., the crystalline product 3α-hydroxy-16-nitromethyl-11,20-pregnanedione 3-acetate was filtered off and washed with hexane. The product contained solvent of crystallization and weighed 89 g., M.P. 90–98° C.

EXAMPLE 2

Preparation of 3α-hydroxy-16-dimethylaminomethyl-11,20-pregnanedione 3-acetate

A mixture of 2.0 g. of 3α-hydroxy-16-nitromethyl-11,20-pregnanedione 3-acetate, 1.1 ml. of 37% formaldehyde solution, 46 mg. of sodium acetate, 50 ml. of methanol, and 27 g. of Raney nickel was hydrogenated at 41 p.s.i. initial pressure and at room temperature. The uptake of hydrogen ceased after 92% of the theoretical amount had been absorbed. After filtration of the catalyst, the filtrate was concentrated to approximately 10 ml. The product 3α-hydroxy-16-dimethylaminomethyl-11,20-pregnanedione 3-acetate was filtered off and washed with methanol. Yield: 850 mg., M.P. 188–192° C. After recrystallization from isopropanol the compound gave the following analysis:

Calculated for $C_{26}H_{38}NO_4$: C, 72.4; H, 9.58; N, 3.24. Found: C, 72.21; H, 9.30; N, 3.39.

EXAMPLE 3

Preparation of 3α-hydroxy-16-dimethylaminomethyl-11,20-pregnanedione 3-acetate N-oxide A mixture of 4.92 g. of 3α-hydroxy-16-dimethylaminomethyl-11,20-pregnanedione 3-acetate, 130 ml. of methanol, and 3.63 ml. of 30% hydrogen peroxide was stirred at room temperature for 256 hours. The excess hydrogen peroxide was decomposed by the addition of a small amount of platinum black and stirring for several hours. The catalyst was filtered off and the filtrate was concentrated in vacuo to give a nearly quantitative yield of 3α - hydroxy - 16 - dimethylaminomethyl-11,20-pregnanedione 3-acetate N-oxide, which was an amorphous glass.

EXAMPLE 4

Preparation of 3α-hydroxy-16-methyl-16-pregnene-11,20-dione 3-acetate

One gram of the crude 3α-acetoxy-16-dimethylaminomethyl-11,20-pregnanedione N-oxide was heated in an oil bath under vacuum. The temperature was increased gradually to 150° C., when it was held for one hour. The residual material was subjected to chromatography on alumina, whereby a mixture of 150 mg. of 3α-hydroxy-16-methyl-16-pregnene-11,20-dione 3-acetate and 3α - hydroxy-16-methylene-11,20-pregnane-3-acetate was obtained. To this mixture was added sodium hydroxide in order to convert the 3α-hydroxy-16-methylene-11,20-pregnane 3-acetate in the mixture to 3α-hydroxy-16-methyl-16-pregnene-11,20-dione 3-acetate.

EXAMPLE 5

Conversion of 3α-hydroxy-16-methyl-16-pregnene-11,20-dione 3-acetate to 17α,21-dihydroxy-16β-methyl-1,4-pregnadiene-3,11,20-trione 21-acetate To a solution of 200 mg. of 3α-hydroxy-16-methyl-16-pregnene-11,20-dione 3-acetate in 20 ml. of methanol was added 200 mg. of 25% palladium on calcium carbonate catalyst. The mixture was stirred in hydrogen (1 atmosphere pressure, 25° C.) until hydrogen uptake was complete. The mixture was filtered, the filtrate taken to dryness, and the residue crystallized from ether-hexane to give 3α-hydroxy - 16β - methyl-11,20-pregnanedione 3-acetate.

To sodium was added dropwise 35 ml. of methanol and hydrogen was evolved. After all methanol was added, the sodium had all dissolved. To this solution was added toluene and the methanol distilled using a column to prevent entrainment of toluene. When the boiling point of the toluene was reached (110° C.), the reaction was cooled to 25° C. To the reaction mixture was added diethyl oxalate and the mixture cooled when necessary to maintain a 20–25° C. temperature. With agitation, 3α-acetoxy-16β-methyl - 11,20-pregnane-dione prepared as described above was added. The total mixture was stirred for 18 hours and a solution containing ethyl 3-acetoxy-16β-methyl - 11,20 - dioxo-21-pregnaneglyoxylate resulted.

The solution of ethyl 3α-acetoxy-16β-methyl-11,20-dioxo-21-pregnaneglyoxylate was added slowly with stirring to petroleum ether. A solid sodium salt of ethyl-3-acetoxy-16β-methyl-11,20-dioxo - 21 - pregnaneglyoxylate precipitated. The mixture was filtered, washed with petroleum ether and dried.

In order to hydrolyze ethyl-3-acetoxy-16β-methyl-11,20-dioxo-21-pregnaneglyoxylate, the solid was slurried in methanol and to this was added 0.5 N sodium hydroxide slowly in 20 minutes. The mixture was stirred at 25° C. for five hours. At the end of this time a turbid mixture occurred. To this turbid reaction mixture was added diatomaceous earth and the mixture filtered through a pad of diatomaceous earth. The filtrate was acidified, with stirring, by adding 1 N hydrochloric acid slowly. The precipitate 3α-hydroxy-16β-methyl-11,20-dioxo-21-pregnaneglyoxylic acid was filtered and washed well with water and dried in vacuo at 60° C. until Karl Fisher for water was less than 0.5%.

To a slurry of 3α-hydroxy-16β-methyl-11,20-dioxo-21-pregnaneglyoxylic acid in acetic anhydride was added 2,4-dinitrobenzenesulfonic acid. The solid was completely in solution after about 15 minutes. The solution was stirred at room temperature for 2.5 hours and then concentrated in vacuo to a thick syrup (waterbath at 50° C.). The syrup was dissolved in benzene and washed twice with 2.5 N sodium hydroxide and water. After drying the benzene solution with magnesium sulfate, the reaction mixture was concentrated in vacuo to yield an isomeric mixture of 3α,23-diacetoxy-16β-methyl-21-normethyl-11-oxo-17(20),22-choladieno-24(20)-lactone and the 17(20)-isomer thereof. The crude isomeric mixture of 3α,23-diacetoxy - 16β - methyl - 21 - normethyl-11-oxo-17(20), 22-choladieno-24(20)-lactone and the 17(20)-isomer thereof was crystallized from ethanol.

The isomeric mixture of 3α,23-diacetoxy-16β-methyl-21-normethyl - 11 - oxo - 17(20),22-choladieno-24(20)-lactone and the 17(20)-isomer thereof was added to a benzene solution of perbenzoic acid and allowed to stand at room temperature for 140 hours. The reaction was then cooled to 15° C. and washed with water. Finally the excess acid was removed by extracting with 10% sodium bicarbonate solution and then washed twice with water. The aqueous layer was backwashed twice with benzene and the combined organic extracted, dried over sodium sulfate, filtered, and concentrated in vacuo to a residue. This residue readily crystallized. The yield was quantitative. In order to separate from ethyl benzoate, the crystalline residue was refluxed with petroleum ether and filtered. The crystalline precipitate was an isomeric mixture of 3α,23-diacetoxy-16β-methyl-21-normethyl-17-(20)-oxido-11-oxo-22-choleno - 24(20) - lactone and the 17(20)-isomer thereof.

In order to hydrolyze the isomeric mixture of 3α,23-diacetoxy-16β-methyl - 21 - normethyl - 17(20)-oxido-11-oxo-22-choleno-24(20)-lactone, the mixture of isomers of 3α,23-diacetoxy-16α-methyl - 21 - normethyl - 17(20)-oxido-11-oxo-22-choleno - 24(20) - lactone and 17(20)-isomer thereof was suspended in ethanol, and to this mixture was added dropwise with stirring, 1 N sodium hydroxide. This reaction was exothermic and cooling was necessary in order to maintain the temperature between 25-30° C. The time of addition was 30 minutes, during which period all the solid dissolved. Additional 1 N sodium hydroxide was now added and the total solution stirred at 25° C. for 18 hours. Crystals of 3α,17α-dihydroxy-16β-methyl-11,20-pregnane-dione separated after two hours. The reaction was acidified with 2.5 N hydrochloric acid and extracted with ethyl acetate. The organic layer was washed with saturated sodium bicarbonate solution to remove excess acid. After washing with water, the ethyl acetate layer was dried over anhydrous sodium sulfate, filtered and concentrated (5-6 cc.) until crystallization occurred. The solution was cooled and filtered and washed with cold ethyl acetate. After drying in vacuo, there was obtained 3α,17α-dihydroxy-16β-methyl-11,20-pregnanedione. The mother liquors were concentrated to 1 cc. and deposited an additional 3α,17α-dihydroxy-16β-methyl-11,20-pregnanedione.

To a solution of 3α,17α-dihydroxy-16β-methyl-11,20-pregnanedione in 25 ml. of chloroform, is added, dropwise with stirring, a solution of bromine in chloroform over a period of 60 minutes. The reaction mixture is dissolved in ethyl acetate and the resulting solution washed with water until neutral, dried and the solvents evaporated therefrom in vacuo. The residual ground material is dissolved in a minimum quantity of ethyl acetate. The resulting solution is diluted with ether and the mixture is stirred until crystals form. The crystalline product is recovered by filtration and washed by slurrying with 50:50 ether-petroleum mixture to give 21-bromo-16,3α, 17α-dihydroxy-16β-methyl-11,20-pregnanedione.

2.5 grams of 21-bromo-3α,17α-dihydroxy-16β-methyl-11,20-pregnanedione is mixed with 2.5 grams of anhydrous potassium acetate, 2.0 grams of sodium iodide and 0.015 ml. of glacial acetic acid and 50 ml. of acetone is added to the resulting mixture. This mixture is then added at reflux with stirring for a period of 16 hours, and the reaction is cooled, filtered, and the insoluble material is washed with acetone. The filtered solution is evaporated in vacuo, thereby removing the solvents, and the residual material is slurried with water and the aqueous mixture extracted with ethyl acetate. The ethyl acetate extract is washed with water to neutrality, dried, and the solvent is evaporated in vacuo to give an oil. This oil is crystallized from ether to give 3α,17α,21-trihydroxy-16β-methyl-11,20-pregnanedione 21-acetate.

A nutrient medium is prepared containing the following ingredients:

Cerelose _____ grams__ 68
Edamin _____ do____ 68
Corn steep liquor _____ ml__ 17
Distilled water to make 3400 ml.

The medium is adjusted to pH 6.5 with potassium hydroxide, sterilized, and inoculated with about 100 ml. of a vegetative growth of a culture *Nocardia blackwellii* (American Type Culture Collection No. 6846). The microorganism and the inoculated culture are then incubated at a temperature of 28° C. with agitation and aeration for a 48 hour period. To the resulting culture is added a solution containing 0.32 g. of 3α,17α,21-trihydroxy-16β-methyl - 11,20 - pregnanedione 21-acetate dissolved in dimethylformamide. The culture containing the steroid can be incubated with agitation and aeration for an additional period of about 24 hours at 28° C.

The fermentation broth is extracted with ethyl acetate and the extract separated and evaporated to dryness. The residual dried product is partitioned between petroleum ether and 70% aqueous methanol, the petroleum ether layer being discarded. The aqueous methanol containing the product is evaporated under reduced pressure to remove the methanol. The resulting water layer is extracted with ethyl acetate several times and the ethyl acetate layer evaporated to dryness to yield 17α,21-dihydroxy - 16β - methyl - 1,4 - pregnadiene - 3,1,20 - trione 21-acetate, a compound which possesses anti-inflammatory activity.

It should be understood that various changes may be made in our process as herein described without effecting the results attained. Thus, various modifications of time, temperature, alkalinity, acidity, etc. and various changes in procedure differing from those herein given as illustrative of the preferred embodiments of our invention may be made without departing from the scope thereof. Accordingly, the scope of our invention is to be determined in accordance with the prior art and appended claims.

What is claimed is:

1. 3α - hydroxy - 16 - nitroalkyl - 11,20 - pregnanedione 3-acylate.

2. 3α - hydroxy - 16 - nitromethyl - 11,20 - pregnanedione 3-acetate.

3. 3α - hydroxy - 16 - dimethylaminomethyl - 11,20-pregnanedione 3-acetate.

4. 16 - dialkylaminoalkyl - 3α - hydroxy - 11,20 - pregnanedione 3-acylate N-oxide.

5. 3α - hydroxy - 16 - dimethylaminomethyl - 11,20-pregnane dione 3 - acetate N-oxide.

6. The process which comprises reacting 3α-hydroxy- 16-nitromethyl-11,20-pregnanedione 3-acetate with formaldehyde and hydrogen and Raney nickel catalyst to form 3α - hydroxy - 16 - dimethylaminomethyl - 11,20-pregnanedione 3-acetate.

7. The process which comprises reacting 3α-hydroxy-16 - dimethylaminomethyl - 11,20 - pregnanedione 3-acetate with hydrogen peroxide to form 3α-hydroxy-16-dimethylaminomethyl - 11,20 - pregnanedione 3 - acetate N-oxide.

8. The process which comprises heating 3α-hydroxy-16 - dimethylaminomethyl - 11,20 - pregnanedione - 3-acetate N-oxide to form a mixture of 3α-hydroxy-16-methyl - 16 - pregnene - 11,20 - dione 3 - acetate and 3α - hydroxy - 16 - methylene - 11,20 - pregnane - dione 3-acetate.

9. The process which comprises reacting a mixture of 16 - alkyl - 3α - hydroxy - 16 - pregnene - 11,20 - dione 3-acylate and 16-alkylene-3α-hydroxy-11,20-pregnanedione 3-acylate with a base to form 16-alkyl-3α-hydroxy-16 - pregnene - 11,20 - dione 3 - acylate.

10. The process which comprises reacting a mixture of 3α - hydroxy - 16 - methyl - 16 - pregnene - 11,20-dione 3 - acetate and 3α - hydroxy - 16 - methylene - 11,20 - pregnanedione 3 - acetate with sodium hydroxide to form 3α - hydroxy - 16 - methyl - 16 - pregnene - 11,20 - dione 3 - acetate.

References Cited in the file of this patent
UNITED STATES PATENTS

| | | |
|---|---|---|
| 2,697,109 | Dodson | Dec. 14, 1954 |
| 2,794,815 | Dodson | June 4, 1957 |